US012783045B2

(12) United States Patent
Huang et al.

(10) Patent No.: US 12,783,045 B2
(45) Date of Patent: Nov. 3, 2026

(54) EYE-TRACKING OPTICAL DEVICE, SYSTEM, AND VIRTUAL REALITY APPARATUS

(71) Applicant: BEIJING 7INVENSUN TECHNOLOGY CO., LTD., Beijing (CN)

(72) Inventors: Tongbing Huang, Beijing (CN); Juanjuan Shang, Beijing (CN); Wenbo Fei, Beijing (CN)

(73) Assignee: BEIJING 7INVENSUN TECHNOLOGY CO., LTD., Beijing (CN)

( * ) Notice: Subject to any disclaimer, the term of this patent is extended or adjusted under 35 U.S.C. 154(b) by 109 days.

(21) Appl. No.: 18/878,031

(22) PCT Filed: Jun. 20, 2023

(86) PCT No.: PCT/CN2023/101519
§ 371 (c)(1),
(2) Date: Nov. 4, 2025

(87) PCT Pub. No.: WO2023/246813
PCT Pub. Date: Dec. 28, 2023

(65) Prior Publication Data

US 2026/0064196 A1 Mar. 5, 2026

(30) Foreign Application Priority Data

Jun. 21, 2022 (CN) ......................... 202210723353.9

(51) Int. Cl.
*G06F 3/01* (2006.01)
*G02B 27/01* (2006.01)
(Continued)

(52) U.S. Cl.
CPC ......... *G06F 3/013* (2013.01); *G02B 27/0179* (2013.01); *H04N 23/56* (2023.01); *G02B 2027/0187* (2013.01); *H04N 23/20* (2023.01)

(58) Field of Classification Search
CPC ................ G06F 3/013; G02B 27/0179; G02B 2027/0187; G02B 13/00; G02B 27/00;
(Continued)

(56) References Cited

U.S. PATENT DOCUMENTS 10,345,903 B2 * 7/2019 Robbins ............ G02B 27/0172
10,877,274 B1 12/2020 Trail
(Continued)

FOREIGN PATENT DOCUMENTS

CN 105408801 A 3/2016
CN 106908951 A 6/2017
(Continued)

OTHER PUBLICATIONS

Chinese Search Report dated Jun. 5, 2025 received in Chinese Application No. 202210723353.9.
(Continued)

*Primary Examiner* — David D Davis
(74) *Attorney, Agent, or Firm* — Scully, Scott, Murphy & Presser, P.C.

(57) ABSTRACT

An eyeball tracking optical device with cemented lens. A lens assembly in the device includes at least one cemented lens, including a first lens portion and a second lens portion. A side surface, away from an eyeball, of the first lens portion is provided with a concave surface. A side surface, close to the eyeball, of the second lens portion is provided with a convex surface. The concave surface is attached to the convex surface to form a cemented surface. The cemented surface is provided with a first reflective layer. The portion, close to an image collection assembly, of the cemented lens
(Continued)

is provided with a first plane having an included angle with a focal plane of the cemented lens. A light source assembly emits first light ray to the eyeball.

20 Claims, 6 Drawing Sheets

(51) Int. Cl.
*H04N 23/56* (2023.01)
*H04N 23/20* (2023.01)

(58) Field of Classification Search
CPC ............... G02B 27/0093; G02B 27/01; G02B 27/0172; G02B 13/006; G02B 13/0065; G02B 27/0101; H04N 23/56; H04N 23/20
See application file for complete search history.

(56) References Cited

U.S. PATENT DOCUMENTS

| | | | | |
|---|---|---|---|---|
| 10,880,542 | B1 | 12/2020 | Rong | |
| 2013/0077049 | A1* | 3/2013 | Bohn | G02B 27/0093 351/210 |
| 2014/0160576 | A1 | 6/2014 | Robbins | |
| 2014/0375542 | A1* | 12/2014 | Robbins | G06T 19/006 345/156 |
| 2015/0185475 | A1* | 7/2015 | Saarikko | G02B 6/02085 382/117 |
| 2016/0370583 | A1* | 12/2016 | Saarikko | G02B 6/34 |
| 2020/0081254 | A1* | 3/2020 | Tam | G02B 27/0176 |
| 2021/0041948 | A1* | 2/2021 | Berkner-Cieslicki | G06F 3/011 |
| 2021/0055560 | A1* | 2/2021 | Benítez | G02B 5/26 |
| 2021/0141190 | A1 | 5/2021 | Cheng | |
| 2021/0314554 | A1* | 10/2021 | Zhang | G02B 27/0172 |

FOREIGN PATENT DOCUMENTS

| | | | |
|---|---|---|---|
| CN | 107562179 | A | 1/2018 |
| CN | 108279496 | A | 7/2018 |
| CN | 109725416 | A | 5/2019 |
| JP | H8-50256 | A | 2/1996 |
| JP | 2001033729 | A | 2/2001 |
| TW | 202141115 | A | 11/2021 |
| WO | 2017/066556 | A1 | 4/2017 |

OTHER PUBLICATIONS

The first office action of counterpart PCT application No. PCT/CN2023/101519 was issued on Sep. 30, 2023.

* cited by examiner

EYE-TRACKING OPTICAL DEVICE, SYSTEM, AND VIRTUAL REALITY APPARATUS

CROSS REFERENCE TO RELATED APPLICATIONS

The present application is a National Stage Entry under 35 U.S.C. § 371 of PCT International Application No. PCT/CN2023/101519 filed on Jun. 20, 2023, which claims the priority of Chinese Patent Application 202210723353.9, filed in the China Patent Office on Jun. 21, 2022, and entitled “Eyeball Tracking Optical Device and System, and Virtual Reality Apparatus”, the entire contents of each of which are incorporated into the present application by reference.

TECHNICAL FIELD

The present disclosure relates to the field of optical technologies, and in particular to an eyeball tracking optical device with cemented lens.

BACKGROUND

The eyeball tracking technology may be implemented by using an optical recording method. The principle of the optical recording method is to use an infrared camera to record eye movement situations of a testee, that is, to acquire an eye image capable of reflecting eye movements, and extract eye features from the acquired eye image so as to establish an estimation model of line of sight, wherein the eye features may include a pupil position, a pupil shape, an iris position, an iris shape, an eyelid position, a canthus position, a light spot position (or a Purkinje image), and the like. The optical recording method includes a pupil-cornea reflection method. The principle of the pupil-cornea reflection method is that a near-infrared light source irradiates an eye, the infrared camera photographs the eye and phonographs a reflection point, that is, a light spot, of the light source on the cornea, so as to obtain an eye image with the light spot.

At present, an eyeball tracking recognition device applied to virtual reality glasses and augmented reality glasses is composed of an image collection portion and a Purkinje image mapping portion, wherein the image collection portion mainly tracks the position of an eyeball by collecting a reflected light ray spot of the eyeball 2, and mainly uses the following solutions for collection in general application scenarios:

(1) As shown in FIG. 1, an image collector 3 directly performs image collection by an eyepiece 1.

(2) As shown in FIG. 2, the image collector 3 performs image collection by using the surface reflection of another internal lens 4 and the eyepiece 1.

(3) As shown in FIG. 3, the image collector 3 performs image collection by internally adding a reflector 4 and using the eyepiece 1.

(4) As shown in FIG. 4, an optical path firstly enters the interior of the eyepiece 1 and is reflected on an outer surface of the eyepiece 1, and then the image collector 3 performs image collection.

In the above collection solutions, the overall volume of the device is increased by adding the lens, and the reflected light ray of the eyeball 2 is prone to total reflection on the surface of the eyepiece 1 or on the surface of the added lens, so that the image collector 3 cannot collect the reflected light ray of the eyeball 2, and thus the eyeball cannot be tracked.

SUMMARY

The present disclosure provides an eyeball tracking optical device and system, and a virtual reality apparatus, so as to solve the problem of total reflection of reflected light ray of an eyeball without increasing the overall volume of the device.

To achieve the above objective, an embodiment in one aspect of the present disclosure provides an eyeball tracking optical device, including: a light source assembly, a lens assembly and an image collection assembly, wherein, the lens assembly includes at least one cemented lens, the cemented lens includes a first lens portion and a second lens portion; a side surface, away from an eyeball, of the first lens portion is provided with a concave surface; a side surface, close to the eyeball, of the second lens portion is provided with a convex surface; the concave surface is attached to the convex surface to form a cemented surface; the cemented surface is provided with a first reflective layer; and the portion, close to the image collection assembly, of the cemented lens is provided with a first plane having an included angle with a focal plane of the cemented lens; and the light source assembly is configured to emit first light ray to the eyeball; the first reflective layer is configured to reflect reflected light ray of the first light ray so as to form light ray to be imaged; the light ray to be imaged enters the image collection assembly from the first plane; and the image collection assembly collects the light ray to be imaged so as to track the eyeball.

According to one embodiment of the present disclosure, the first plane is perpendicular to the focal plane.

According to one embodiment of the present disclosure, the first plane is located in a non-visible region of the lens assembly.

According to one embodiment of the present disclosure, the eyeball tracking optical device further includes a light ray direction adjustment assembly, and the light ray direction adjustment assembly is provided with a second reflective layer, configured to reflect the light ray to be imaged, so that the adjusted light ray to be imaged is incident to the image collection assembly.

According to one embodiment of the present disclosure, the light ray direction adjustment assembly is at least one of a reflective prism, a reflective plane mirror, and a reflective curved mirror.

According to one embodiment of the present disclosure, the reflective prism or the reflective plane mirror or the reflective curved mirror is fixedly attached to the first plane.

According to one embodiment of the present disclosure, the diameter of the concave surface or the convex surface is greater than or equal to the diameter of a visible region of the lens assembly.

According to one embodiment of the present disclosure, the light source assembly is an infrared light source assembly, and the first reflective layer is an infrared reflective layer.

To achieve the above objective, an embodiment in a second aspect of the present disclosure provides an eyeball tracking optical system, including: two eyeball tracking optical devices in any of the embodiments of the present disclosure; a left eye viewing assembly, wherein one of the eyeball tracking optical devices is installed on the left eye viewing assembly; and a right eye viewing assembly, wherein one of the eyeball tracking optical devices is installed on the right eye viewing assembly, wherein the left eye viewing assembly and the right eye viewing assembly are distributed in a bilateral symmetry manner.

To achieve the above objective, an embodiment in a third aspect of the present disclosure provides a virtual reality apparatus, including the eyeball tracking optical system provided in the present disclosure.

According to the eyeball tracking optical device and system, and the virtual reality apparatus provided in the present disclosure, the eyeball tracking optical device includes the light source assembly, the lens assembly and the image collection assembly; the lens assembly includes at least one cemented lens, the cemented lens includes the first lens portion and the second lens portion; the side surface, away from the eyeball, of the first lens portion is provided with the concave surface; the side surface, close to the eyeball, of the second lens portion is provided with the convex surface; the concave surface is attached to the convex surface to form the cemented surface; the cemented surface is provided with the first reflective layer; and the portion, close to the image collection assembly, of the cemented lens is provided with the first plane forming the included angle with the focal plane of the cemented lens; and the light source assembly is configured to emit the first light ray to the eyeball; the first reflective layer is configured to reflect the reflected light ray of the first light ray so as to form the light ray to be imaged; the light ray to be imaged enters the image collection assembly from the first plane; and the image collection assembly collects the light ray to be imaged so as to track the eyeball. In this way, by setting the lens in an original lens assembly as the cemented lens and providing the first reflective layer for the cemented surface, the reflected light ray of the first light ray can be reflected to form the light ray to be imaged, and the light ray to be imaged is incident to the image collection assembly from the first plane, therefore on the premise of not increasing additional lenses, the problems of the first light ray in an original image collection portion being prone to total reflection by an eyepiece or an added lens, and the image collection assembly being unable to collect the light ray to be imaged are solved.

It should be understood that the content described herein is not intended to identify key or important features of the embodiments of the present disclosure, nor is it intended to limit the scope of the present disclosure. Other features of the present disclosure will be easily understood from the following specification.

BRIEF DESCRIPTION OF THE DRAWINGS

To illustrate technical solutions in the present disclosure more clearly, a brief introduction on the drawings which are needed in the description of the embodiments is given below. Apparently, the drawings in the description below are merely some embodiments of the present application, based on which other drawings may be obtained by those ordinary skilled in the art without any creative effort.

REFERENCE SIGNS

100: eyeball tracking optical device; 101: light source assembly; 102: lens assembly; 1021: first lens portion; 1022: second lens portion; 1023: first reflective layer; 103: image collection assembly; 104: first plane; 105: first light ray; 106: eyeball; 107: light ray to be imaged; 108: reflected light ray; 1024: non-visible region; 1025: visible region; 109: cutting line; 110: light ray direction adjustment assembly; 1101: second reflective layer; 200: eyeball tracking optical system; 201: left eye viewing assembly; 202: right eye viewing assembly; 300: virtual display device.

DETAILED DESCRIPTION OF THE EMBODIMENTS

In order to enable those skilled in the art to better understand the solutions of the present disclosure, a clear and complete description of technical solutions in the present disclosure will be given below, in combination with the drawings in the present disclosure. Apparently, the embodiments described below are merely a part, but not all, of the embodiments of the present disclosure. All of other embodiments, obtained by those ordinary skilled in the art based on the embodiments in the present disclosure without any creative effort, fall into the protection scope of the present disclosure.

It should be noted that, the terms "first" and "second" and the like in the specification, claims and the above drawings of the present disclosure are used for distinguishing similar objects, and are not necessarily used for describing a specific sequence or precedence order. It should be understood that the data used in this way may be interchanged under appropriate circumstances, so that the embodiments of the present disclosure described herein may be implemented in a sequence other than those illustrated or described herein. In addition, the terms "including" and "having", and any variations thereof are intended to cover non-exclusive inclusions.

Figure 1:
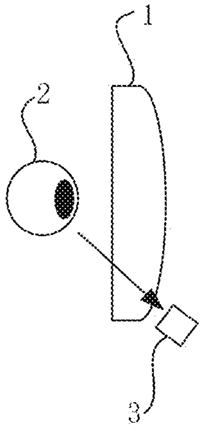
FIG. 1 is an optical path diagram of light ray to be imaged in the related art.
Figure 2:
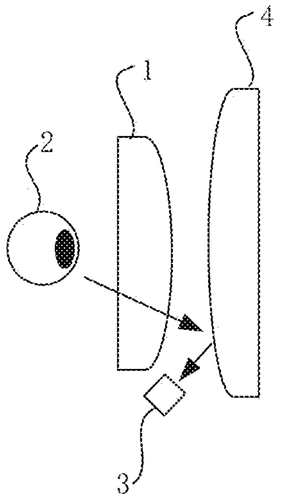
FIG. 2 is an optical path diagram of another light ray to be imaged in the related art.
Figure 3:
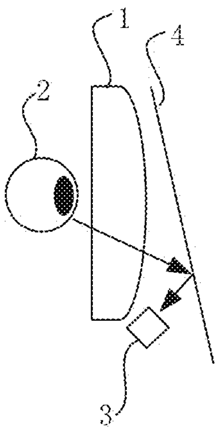
FIG. 3 is an optical path diagram of yet another light ray to be imaged in the related art.
Figure 4:
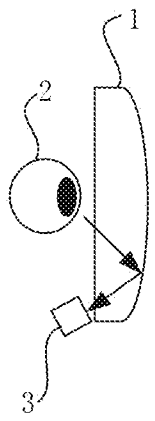
FIG. 4 is an optical path diagram of still another light ray to be imaged in the related art.

FIG. 1 to FIG. 4 are optical path diagrams of light ray to be imaged in the related art, wherein in the solution shown in FIG. 1, an image is directly collected, which is greatly affected by the volume of an optical path, and light ray is prone to total reflection when passing through a lens, and thus the image cannot be collected; in the solution shown in FIG. 2, another internal lens is used, the reflection effect is limited, targeted optimization cannot be performed, and the total reflection is also easy to occur; in the solution shown in FIG. 3, if a reflector is added inside, the space is seriously limited, and thus cannot be implemented in many scenarios; and in the solution shown in FIG. 4, the other surface of an eyepiece is used for reflection, but due to the limitation that a reflective surface must be a convex surface, the total reflection occurs on a concave surface, and thus collection cannot be implemented.

In view of the above problems, the present disclosure provides an eyeball tracking optical device and system, and a virtual reality apparatus, wherein the eyeball tracking optical device includes: a light source assembly, a lens assembly and an image collection assembly; the lens assembly includes at least one cemented lens, the cemented lens includes a first lens portion and a second lens portion, a side surface, away from an eyeball, of the first lens portion is provided with a concave surface, a side surface, close to the eyeball, of the second lens portion is provided with a convex surface, the concave surface is attached to the convex surface to form a cemented surface, the cemented surface is provided with a first reflective layer, and the portion, close to the image collection assembly, of the cemented lens is provided with a first plane having an included angle with a focal plane of the cemented lens; and the light source assembly is configured to emit first light ray to the eyeball, the first reflective layer is configured to reflect reflected light ray of the first light ray so as to form light ray to be imaged, the light ray to be imaged enters the image collection assembly from the first plane, and the image collection assembly collects the light ray to be imaged so as to track the eyeball. In this way, by setting the lens in an original lens assembly as the cemented lens and providing the first reflective layer for the cemented surface, the reflected light ray of the first light ray can be reflected to form the light ray to be imaged, and the light ray to be imaged is incident to the image collection assembly from the first plane, therefore on the premise of not increasing additional lenses, the problems of the reflected light ray of the first light ray in an original image collection portion being prone to total reflection by an eyepiece or an added lens, and the image collection assembly being unable to collect the light ray to be imaged are solved.

Figure 5:
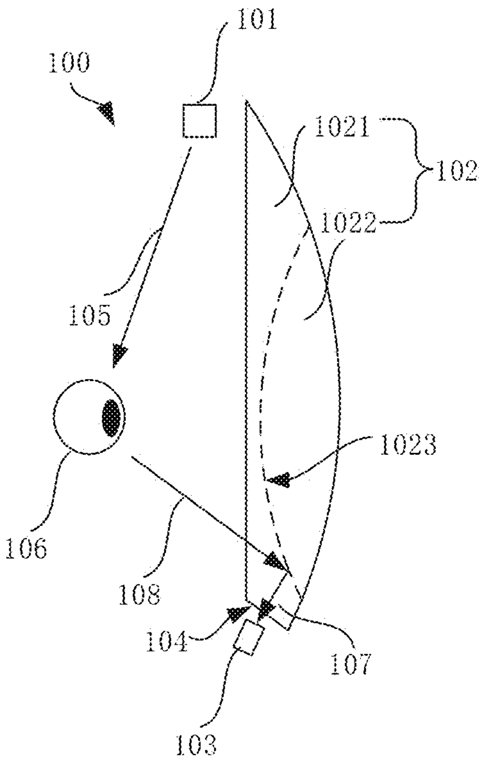
FIG. 5 is a schematic diagram of an optical path of an eyeball tracking optical device provided in the present disclosure.

FIG. 5 is a schematic diagram of an optical path of an eyeball tracking optical device provided in the present disclosure. As shown in FIG. 5, the eyeball tracking optical device 100 includes a light source assembly 101, a lens assembly 102 and an image collection assembly 103, wherein, the lens assembly 102 includes at least one cemented lens, the cemented lens includes a first lens portion 1021 and a second lens portion 1022, a side surface of the first lens portion 1021 that is away from an eyeball is provided with a concave surface, a side surface of the second lens portion 1022 that is close to the eyeball is provided with a convex surface, the concave surface is attached to the convex surface to form a cemented surface, the cemented surface is provided with a first reflective layer 1023, and the portion of the cemented lens that is close to the image collection assembly 103 is provided with a first plane 104 having an included angle with a focal plane of the cemented lens; and the light source assembly 101 is configured to emit first light ray 105 to the eyeball 106, the first reflective layer 1023 is configured to reflect reflected light ray 108 of the first light ray 105 so as to form light ray to be imaged 107, the light ray to be imaged 107 enters the image collection assembly 103 from the first plane 104, and the image collection assembly 103 collects the light ray to be imaged 107 so as to track the eyeball 106.

It should be noted that the light source assembly 101 may be arranged around the lens assembly 102, and the light source assembly 101 shown in FIG. 5 is only a portion herein. The light source assembly 101 emits the first light ray 105 to the eyeball 106 so as to form a light spot on the eyeball 106, the eyeball 106 reflects the first light ray 105 to form the reflected light ray 108, the reflected light ray 108 is reflected by the first reflective layer 1023 to form the light ray to be imaged 107, the light ray to be imaged 107 is emitted from the first plane 104 and is incident to the image collection assembly 103, and the image collection assembly 103 performs imaging on the light ray to be imaged so as to track the eyeball 106.

The concave surface of the first lens portion 1021 and the convex surface of the second lens portion 1022 are attached to form the cemented surface, the attachment material may be a transparent optical adhesive, such as a polyimide material. The first lens portion 1021 and the second lens portion 1022 are different components of the same lens, and a lens (e.g., an eyepiece) in a related device is formed after the first lens portion 1021 and the second lens portion 1022 are attached to each other. In addition, the first reflective layer 1023 may reflect light ray of a wave band emitted from the light source assembly 101. The first reflective layer 1023 may be coated on the concave surface of the first lens portion 1021 and/or the convex surface of the second lens portion 1022. In addition, in the design stage of an eyeball tracking optical path solution, targeted optimization may be performed on an intermediate surface type (the curvature of the cemented surface) of the first lens portion 1021 and the second lens portion 1022, the refractive indexes of the first lens portion 1021 and the second lens portion 1022 are the same (or different, and the refractive indexes need to be selected according to specific usage scenarios), and a reflection surface type (generally a convex surface, and a protrusion faces the eye side) suitable for an application scenario may be optimized and discovered. The first reflective layer 1023 does not affect the presentation of a visual picture of the related device. The image collection assembly 103 may be a CMOS camera or a CCD camera. So far, the image collection assembly 103 does not affect the design of an original optical path system while collecting an eye image. Therefore, the first lens portion 1021 and the second lens portion 1022 are cemented without changing the design of an original optical path or adding a new lens, but the direction of the optical path of the light ray to be imaged is changed, such that the structure of the device is compact, and the problem of the total reflection being easy to occur in the related art is solved.

Figure 6:
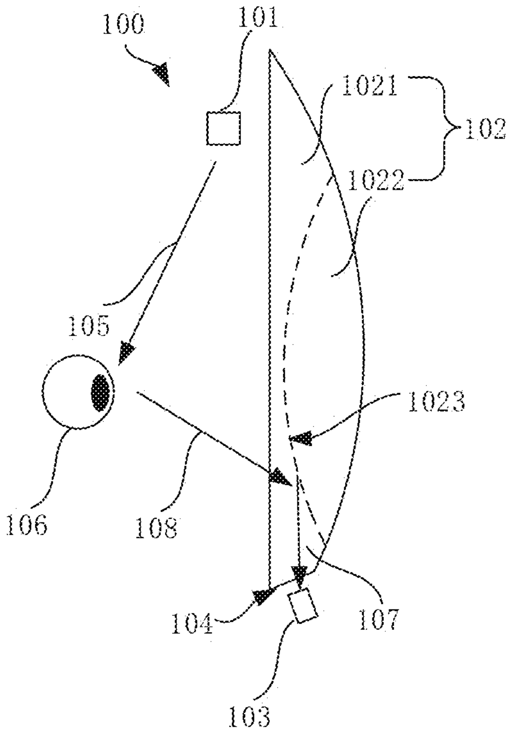
FIG. 6 is a schematic diagram of an optical path of an eyeball tracking optical device provided in one embodiment of the present disclosure.

The first plane 104 has a certain included angle with the focal plane of the cemented lens, wherein the included angle between the first plane and the focal plane may be determined according to the distance between the eyeball 106 and the side surface of the first lens portion 1021 that is close to the eyeball 106, or the size of the eyeball 106 (for example, adults and children have different eye sizes), the propagation direction of the first light ray 105 emitted from the light source assembly 101, the position of the reflected light ray 108 of the first light ray 105 on the eyeball, and the disposition position of the light source assembly 101. Wherein, FIG. 5 and FIG. 6 illustrate two examples of the first plane 104. In the two examples, the image collection assembly 103 shown in FIG. 5 deviates towards the direction of the eyeball 106 of a user, the image collection assembly 103 shown in FIG. 6 deviates towards the device, and the image collection assembly 103 may be integrated into the device so as to reduce the volume of the device. In actual design, the deviation of the first plane 104 may be selected according to actual situations.

Figure 7:
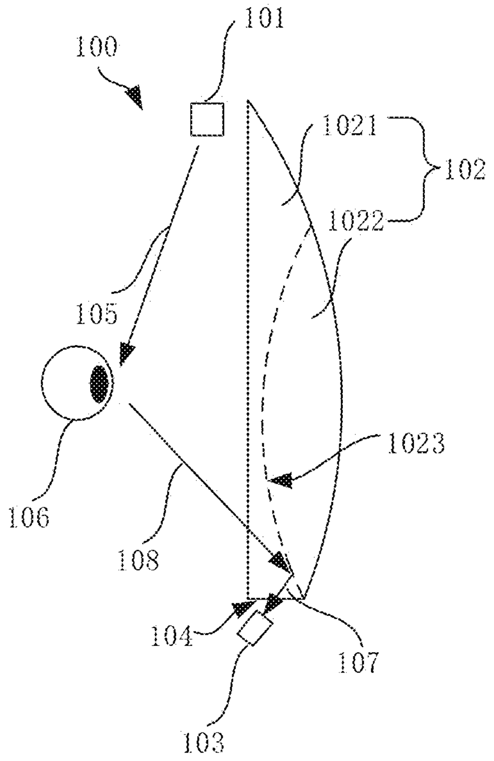
FIG. 7 is a schematic diagram of an optical path of an eyeball tracking optical device provided in another embodiment of the present disclosure.

Optionally, as shown in FIG. 7, the first plane 104 is perpendicular to the focal plane. At this time, the reflected light ray 108 of the first light ray 105 is reflected by the first reflective layer 1023 to form the light ray to be imaged 107, and the light ray to be imaged 107 may be more collected by the image collection assembly 103.

It can be understood that in three examples shown in FIG. 5 to FIG. 7, the disposition position of the image collection assembly 103 is set on the basis of the position of collecting the most light to be imaged 107. Since the reflected light ray 108 of the first light ray 105 is only reflected once by the first reflective layer 1023 in the lens assembly 102 and then is collected by the image collection assembly 103, the energy loss of the light ray to be imaged 107 collected by the image collection assembly 103 is less, the brightness of an image presented in the image collection assembly 103 is higher, and thus the picture is clearer, thereby facilitating to improve the sensitivity of tracking the position of the eyeball.

Figure 8:
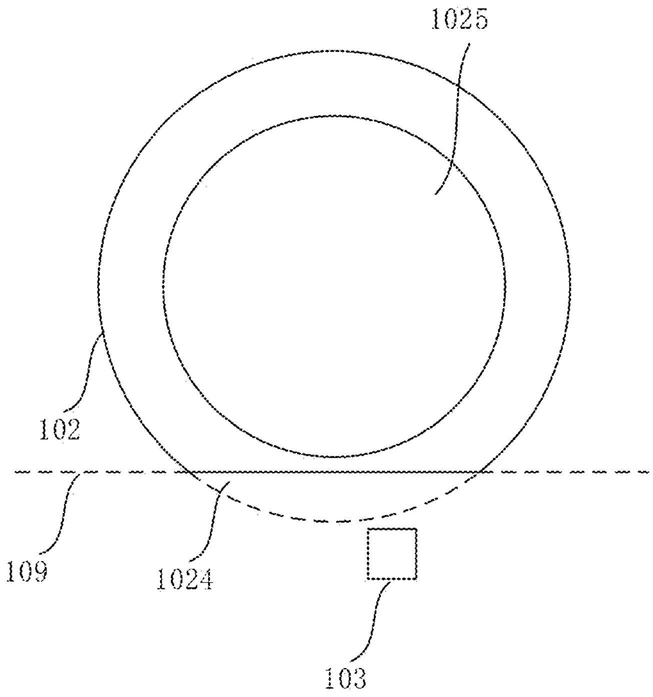
FIG. 8 is a front view of a lens assembly in an eyeball tracking optical device provided in one embodiment of the present disclosure.

According to one embodiment of the present disclosure, as shown in FIG. 8, the first plane 104 is located in a non-visible region of the lens assembly 102.

The lens assembly 102 has a visible region 1025 and a non-visible region 1024, and the visible region 1025 is configured to present and display a picture when the user uses the device, and the non-visible region 1024 is an idle non-display border region of the lens assembly 102. Therefore, the portion of the cemented lens in the lens assembly 102 that is close to the image collection assembly 103 may be cut by a cutting line 109, and a plane where the cutting line 109 is located is the first plane 104, so as to achieve the purpose of emitting the light ray to be imaged 107 from the first plane 104, thereby facilitating the disposition of the image collection assembly 103 inside the overall device and facilitating the overall integration of the device. Therefore, it is possible to solve the problem of the volume of the device being relatively large due to the fact that the reflected light ray 108 is emitted along the side surface of the cemented lens close to the eyeball and thus the image collection assembly 103 needs to be installed outside the device.

Figure 9:
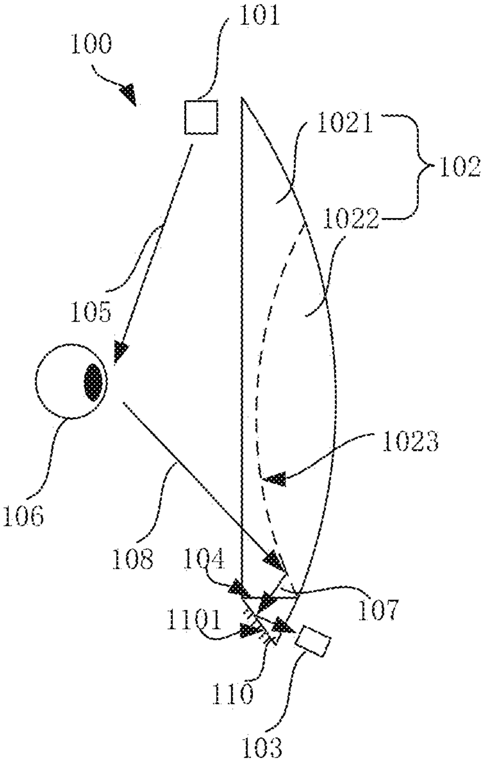
FIG. 9 is a schematic diagram of an optical path of an eyeball tracking optical device provided in yet another embodiment of the present disclosure.
Figure 10:
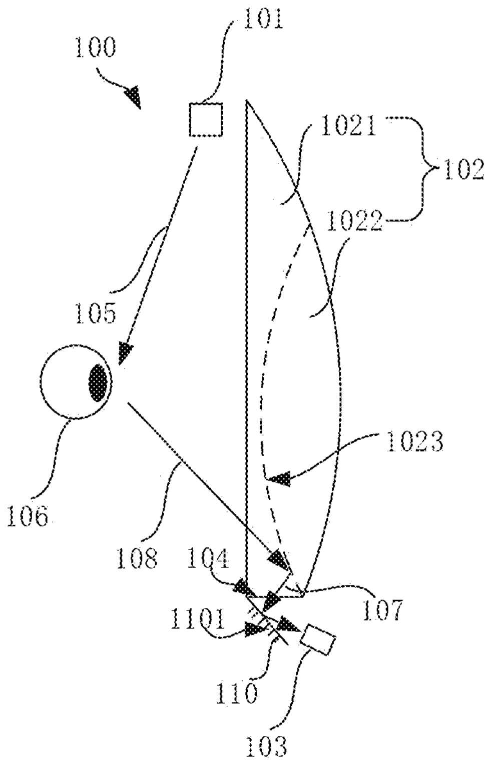
FIG. 10 is a schematic diagram of an optical path of an eyeball tracking optical device provided in still another embodiment of the present disclosure.
Figure 11:
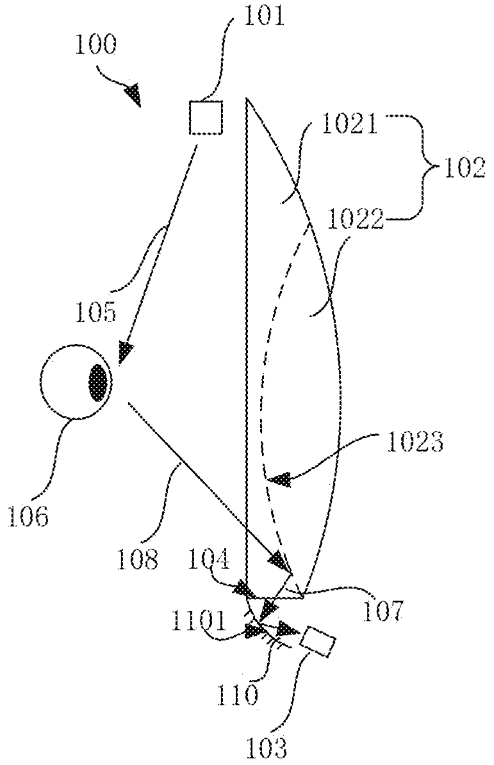
FIG. 11 is a schematic diagram of an optical path of an eyeball tracking optical device provided in still another embodiment of the present disclosure.

According to one embodiment of the present disclosure, as shown in FIG. 9 to FIG. 11, the eyeball tracking optical device 100 further includes a light ray direction adjustment assembly 110, and the light ray direction adjustment assembly 110 is provided with a second reflective layer 1101, configured to reflect the light ray to be imaged 107, so that the adjusted light ray to be imaged is incident to the image collection assembly 103.

Optionally, the light direction adjusting assembly 110 is at least one of a reflective prism, a reflective plane mirror, and a reflective curved mirror.

Optionally, the reflective prism or the reflective plane mirror or the reflective curved mirror is fixedly attached to the first plane 104. The attachment may be implemented by the bonding of an optical adhesive.

It should be noted that, it is taken as an example that the first plane 104 is perpendicular to the focal plane, as shown in FIG. 9, when the light direction adjusting assembly 110 is a reflective prism, the light ray to be imaged 107 is reflected from the second reflective layer 1101 of the reflective prism and then is incident to the image collection assembly 103, thereby adjusting the placement position of the image collection assembly 103. FIG. 10 is an example in which the light ray direction adjustment assembly 110 is a reflective plane mirror, and FIG. 11 is an example in which the light ray direction adjustment assembly 110 is a reflective curved mirror. In addition, when the first plane 104 forms another included angle with the focal plane, the light ray direction adjustment assembly 110 is disposed with reference to the above embodiments to change the placement position of the image collection assembly 103, thereby facilitating the flexible design of the image collection assembly 103 in the device.

According to one embodiment of the present disclosure, the diameter of the concave surface or the convex surface is greater than or equal to the diameter of the visible region 1025 of the lens assembly 102. Therefore, the edge of the cemented surface is located in the non-visible region 1024 of the lens assembly 102, so as to avoid the influence of the cemented edge on the visual picture in the visible region 1024. As shown in FIG. 8, a boundary between the visible region 1025 and the non-visible region 1024 may be used as an outer contour edge of the cemented surface.

In all of the above embodiments, the light source assembly 101 may be an infrared light source assembly, the first reflective layer 1023 may be an infrared reflective layer, and the second reflective layer 1101 on the light ray direction adjustment assembly 110 may also be an infrared reflective layer. The infrared light source assembly may be formed by arranging a plurality of infrared LED lamps around the lens assembly 102. The image collection assembly 103 may include a corresponding infrared imaging system.

Thus, for the solutions shown in the related art in FIG. 1 to FIG. 4, there is a problem of corresponding limited scenarios in use, a cementation solution proposed in the present disclosure may solve the problem, the cementation solution is to split the eyepiece into two portions, and targeted optimization may be performed on the split surface types to adapt to different usage scenarios and to freely select the amplification factors of angles. Specifically, the usage scenario of the optical path in FIG. 1 is limited, and in a system with a relatively small distance of exit pupil, the image collection distance is too short to meet the requirement for a large field of view. The eyeball tracking optical device provided in the present disclosure increases the length of the optical path by folding the optical path, so as to avoid this problem. In FIG. 2, due to the design constraints of the original system, the reflective surface of the original system cannot be optimized, and thus a good collection effect cannot be achieved. The eyeball tracking optical device provided in the present disclosure well solves this problem by optimizing the cemented surface. In FIG. 3, an air gap of at least 2 cm is required to increase the internal reflector, many devices cannot meet this condition, but the eyeball tracking optical device provided in the present disclosure is not limited thereto. In FIG. 4, the second surface of the eyepiece is generally a concave surface, which is prone to severe total reflection, and at this time, the photographing effect is sharply reduced. The reflective surface of the eyeball tracking optical device provided in the present disclosure may be a convex surface, thereby avoiding this problem.

Figure 12:
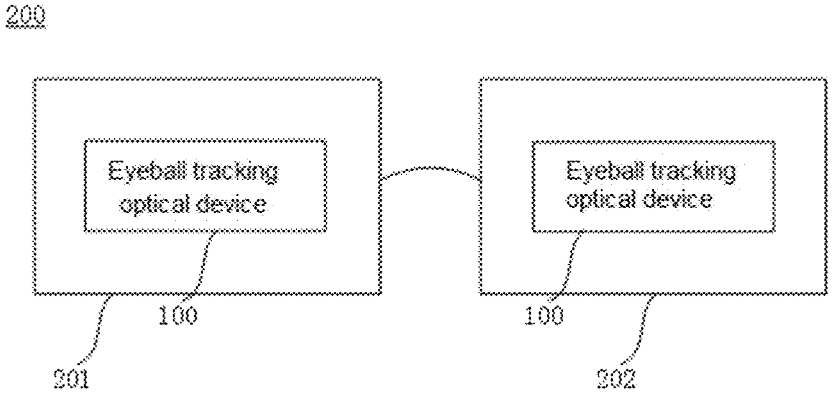
FIG. 12 is a schematic block diagram of an eyeball tracking optical system provided in the present disclosure.

FIG. 12 is a block diagram of an eyeball tracking optical system provided in the present disclosure. As shown in FIG. 12, the eyeball tracking optical system 200 includes two eyeballs tracking optical devices 100 in any of the embodiments of the present disclosure;

a left eye viewing assembly 201, wherein one eyeball tracking optical device 100 is installed on the left eye viewing assembly 201; and a right eye viewing assembly 202, wherein one eyeball tracking optical device 100 is installed on the right eye viewing assembly 202, wherein the left eye viewing assembly 201 and the right eye viewing assembly 202 are distributed in a bilateral symmetry manner.

Figure 13:
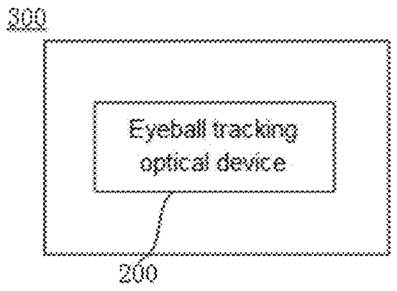
FIG. 13 is a schematic block diagram of a virtual reality apparatus provided in the present disclosure.

FIG. 13 is a schematic block diagram of a virtual reality apparatus provided in the present disclosure. As shown in FIG. 13, the virtual display device 300 includes the eyeball tracking optical system 200 provided in the present disclosure.

In summary, according to the eyeball tracking optical device and system, and the virtual reality apparatus provided in the present disclosure, the eyeball tracking optical device includes the light source assembly, the lens assembly and the image collection assembly, wherein the lens assembly includes at least one cemented lens, the cemented lens includes the first lens portion and the second lens portion, the side surface, away from the eyeball, of the first lens portion is provided with the concave surface, the side surface, close to the eyeball, of the second lens portion is provided with the convex surface, the concave surface is attached to the convex surface to form the cemented surface, the cemented surface is provided with the first reflective layer, and the portion, close to the image collection assembly, of the cemented lens is provided with the first plane forming the included angle with the focal plane of the cemented lens; and the light source assembly is configured to emit the first light ray to the eyeball, the first reflective layer is configured to reflect the reflected light ray of the first light ray so as to form the light ray to be imaged, the light ray to be imaged enters the image collection assembly from the first plane, and the image collection assembly collects the light ray to be imaged so as to track the eyeball. In this way, by setting the lens in an original lens assembly as the cemented lens and providing the first reflective layer for the cemented surface, the reflected light ray of the first light ray can be reflected to form the light ray to be imaged, and the light ray to be imaged is incident to the image collection assembly from the first plane, therefore on the premise of not increasing additional lenses, the problems of the reflected light ray of the first light ray in an original image collection portion being easy to be totally reflected by an eyepiece or an added lens, and the image collection assembly being unable to collect the light ray to be imaged are solved.

The above specific embodiments do not constitute a limitation on the protection scope of the present disclosure. Those skilled in the art should understand that various modifications, combinations, sub-combinations and substitutions may be made according to design requirements and other factors. Any modifications, equivalent substitutions, improvements and the like, made within the spirit and principles of the present disclosure, shall be included in the protection scope of the present disclosure.

The invention claimed is:

1. An eyeball tracking optical device, comprising:

a light source assembly;

a lens assembly; and an image collection assembly, wherein:

the lens assembly comprises at least one cemented lens, the cemented lens comprises a first lens portion and a second lens portion;

a side surface, away from an eyeball, of the first lens portion is provided with a concave surface;

a side surface, close to the eyeball, of the second lens portion is provided with a convex surface;

the concave surface is attached to the convex surface to form a cemented surface;

the cemented surface is provided with a first reflective layer;

a portion, close to the image collection assembly, of the cemented lens is provided with a first plane having an included angle with a focal plane of the cemented lens;

the light source assembly is configured to emit a first light ray to the eyeball;

the first reflective layer is configured to reflect a reflected light ray of the first light ray so as to form a light ray to be imaged;

the light ray to be imaged enters the image collection assembly from the first plane; and the image collection assembly collects the light ray to be imaged so as to track the eyeball.

2. The eyeball tracking optical device according to claim 1, wherein the first plane is perpendicular to the focal plane.

3. The eyeball tracking optical device according to claim 2, wherein the first plane is located in a non-visible region of the lens assembly.

4. The eyeball tracking optical device according to claim 3, wherein the light source assembly is an infrared light source assembly, and the first reflective layer is an infrared reflective layer.

5. The eyeball tracking optical device according to claim 2, wherein the light source assembly is an infrared light source assembly, and the first reflective layer is an infrared reflective layer.

6. The eyeball tracking optical device according to claim 1, further comprising: a light ray direction adjustment assembly, wherein the light ray direction adjustment assembly is provided with a second reflective layer, configured to reflect the light ray to be imaged, so that an adjusted light ray to be imaged is incident to the image collection assembly.

7. The eyeball tracking optical device according to claim 6, wherein the light ray direction adjustment assembly is at least one of a reflective prism, a reflective plane mirror, and a reflective curved mirror.

8. The eyeball tracking optical device according to claim 7, wherein the reflective prism or the reflective plane mirror or the reflective curved mirror is fixedly attached to the first plane.

9. The eyeball tracking optical device according to claim 6, wherein the light source assembly is an infrared light source assembly, and the first reflective layer is an infrared reflective layer.

10. The eyeball tracking optical device according to claim 1, wherein a diameter of the concave surface or the convex surface is greater than or equal to a diameter of a visible region of the lens assembly.

11. The eyeball tracking optical device according to claim 1, wherein the light source assembly is an infrared light source assembly, and the first reflective layer is an infrared reflective layer.

12. An eyeball tracking optical system, comprising: two eyeball tracking optical devices according to claim 1;

a left eye viewing assembly, wherein one of the eyeball tracking optical devices is installed on the left eye viewing assembly; and a right eye viewing assembly, wherein one of the eyeball tracking optical devices is installed on the right eye viewing assembly, wherein the left eye viewing assembly and the right eye viewing assembly are distributed in a bilateral symmetry manner.

13. A virtual reality apparatus, comprising the eyeball tracking optical system according to claim 12.

14. The eyeball tracking optical system according to claim 12, wherein the first plane is perpendicular to the focal plane.

15. The eyeball tracking optical system according to claim 12, wherein the first plane is located in a non-visible region of the lens assembly.

16. The eyeball tracking optical system according to claim 12, further comprising: a light ray direction adjustment assembly, wherein the light ray direction adjustment assembly is provided with a second reflective layer, configured to reflect the light ray to be imaged, so that an adjusted light ray to be imaged is incident to the image collection assembly.

17. The eyeball tracking optical system according to claim 12, wherein the light ray direction adjustment assembly is at least one of a reflective prism, a reflective plane mirror, and a reflective curved mirror.

18. The eyeball tracking optical system according to claim 12, wherein the reflective prism or the reflective plane mirror or the reflective curved mirror is fixedly attached to the first plane.

19. The eyeball tracking optical system according to claim 12, wherein a diameter of the concave surface or the convex surface is greater than or equal to a diameter of a visible region of the lens assembly.

20. The eyeball tracking optical system according to claim 12, wherein the light source assembly is an infrared light source assembly, and the first reflective layer is an infrared reflective layer.

* * * * *